(No Model.) 2 Sheets—Sheet 1.
N. MANDEL.
HOG SHACKLE.
No. 577,048. Patented Feb. 16, 1897.
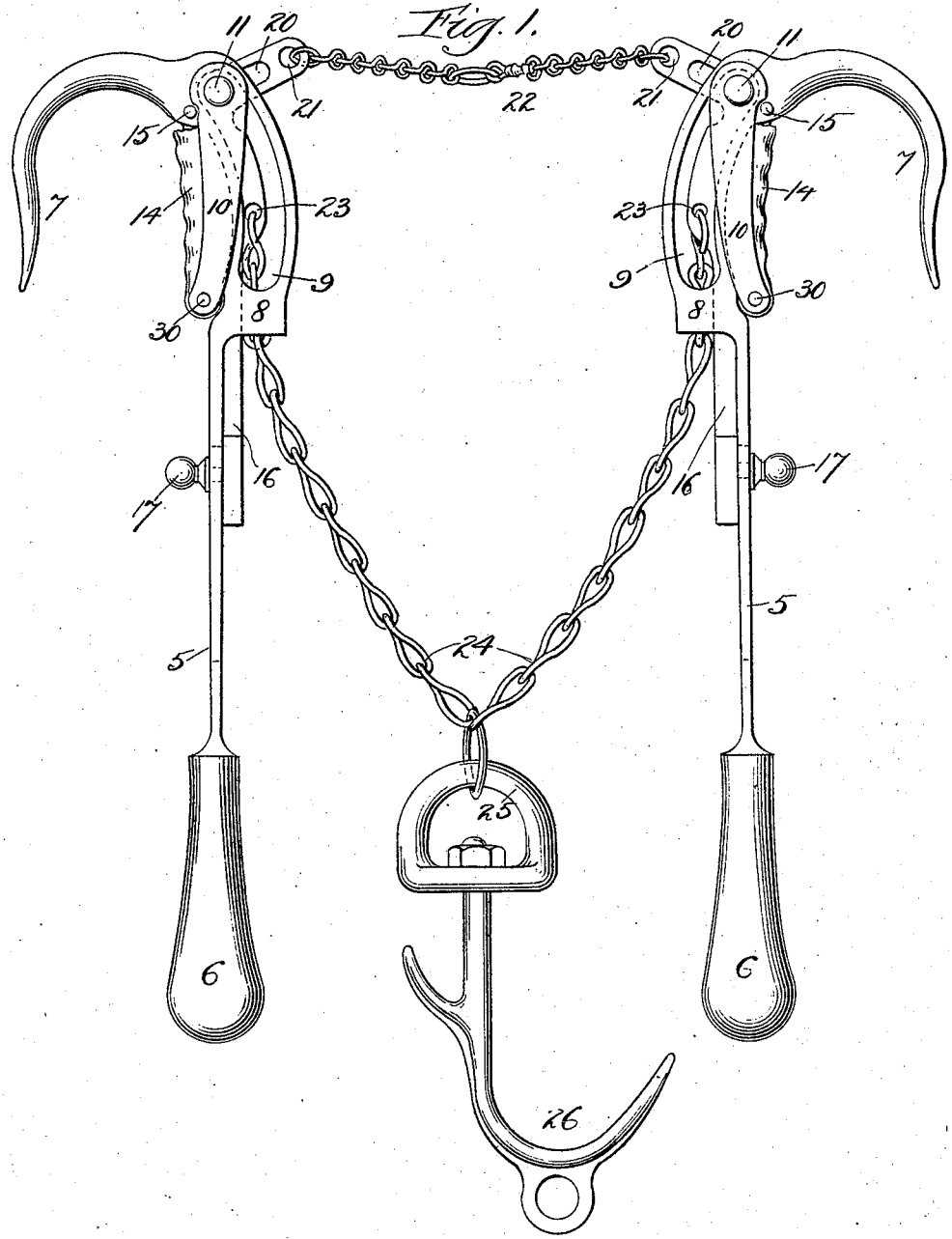

(No Model.) 2 Sheets—Sheet 2.
N. MANDEL.
HOG SHACKLE.
No. 577,048. Patented Feb. 16, 1897.
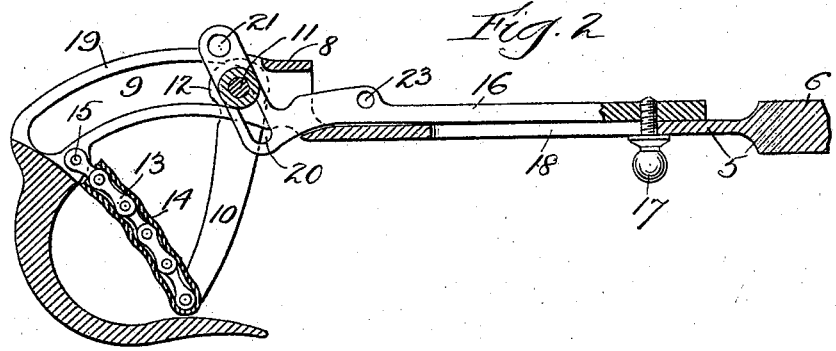
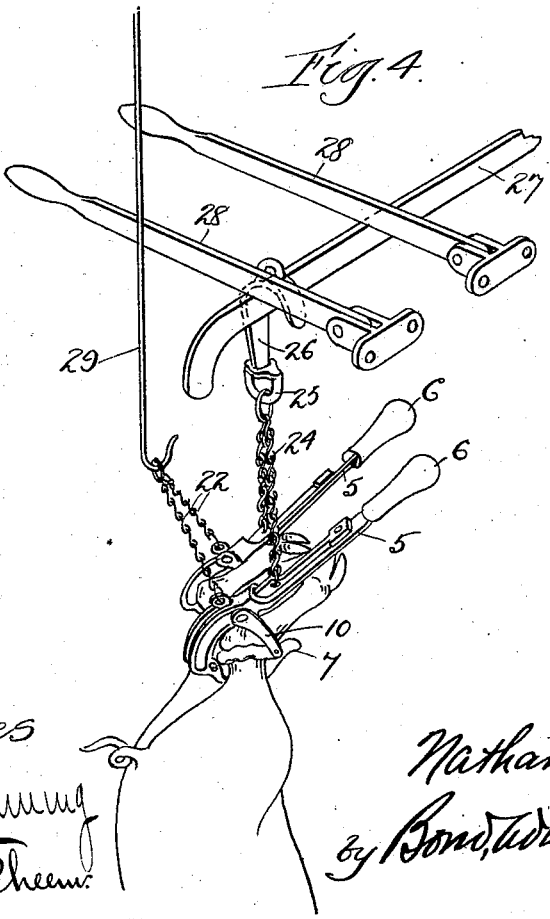
Witnesses
Inventor
Nathan Mandel
by Bond, Adams, Pickard & Jackson
his Att'ys

UNITED STATES PATENT OFFICE.

NATHAN MANDEL, OF CHICAGO, ILLINOIS, ASSIGNOR TO HIMSELF AND KATE ROTH, OF SAME PLACE.

HOG-SHACKLE.

SPECIFICATION forming part of Letters Patent No. 577,048, dated February 16, 1897.

Application filed November 19, 1896. Serial No. 612,684. (No model.)

*To all whom it may concern:*

Be it known that I, NATHAN MANDEL, a citizen of the United States, residing in Chicago, in the county of Cook and State of Illinois, have invented certain new and useful Improvements in Hog-Shackles, of which the following is a specification, reference being had to the accompanying drawings, in which—

Figure 1 is a side elevation of a pair of my improved shackles coupled together and opened ready to receive the legs of a hog. Fig. 2 is a longitudinal section through one of the shackles. Fig. 3 is an edge view of the shackle. Fig. 4 is a perspective view showing the manner in which a hog is held suspended by my device.

This invention relates to an improved hog-shackle by which hogs are caught, held, and suspended preparatory to slaughtering them; and it has for its objects to provide a device for the purposes named that is simple in construction and efficient in operation, one that can be quickly and easily opened to receive the leg of a hog and as easily opened to release the leg when desired, and that will not so bruise or injure the animal as to affect the market value of any of the products derived from the hog. I accomplish these objects by the construction shown in the drawings and hereinafter fully described.

That which I regard as new will be set forth in the claims.

In the drawings, 5 represents a bar, at one end of which is a handle 6, and at the other end is a hook 7, of a shape and size to enable it to fit around and approximately conform to the shape of a hog's leg. The forward end of the bar 5 opposite the hook 7 is enlarged, as shown, as indicated at 8, and is provided with a curved groove 9. 10 are arms, one on each side of the enlarged portion 8 and pivotally attached thereto by a pin 11, passing through the curved slot 9. Loosely mounted on this pin are two antifriction-rollers 12, which travel in the slot 9 in contact with the edges thereof, as shown clearly in Fig. 2. The projecting ends of the arms 10 are connected by a short cross-bar 30, to which one end of a strong flexible connection 13 is attached, the other end of such connection being attached by a bolt or cross-piece 15 to the body of the device near the inner end of the hook 7. As shown, this connection 13 is in the form of a chain, and it is covered with leather 14 or other suitable material to aid in preventing injury to the leg of the hog when caught and held in the hook.

16 is a slide lying against the bar 5 and movably attached thereto by means of a knob or handle 17, the stem of which passes through a longitudinal slot 18 in said bar 5 and into the slide. (See Fig. 2.) The forward end of this slide projects through an opening in the bottom of the enlarged portion 8 and is turned or bent upward and slightly forward and passes through a second slot 19 in the enlarged portion 8, such slot 19 being at right angles to the plane of the slot 9, the two slots being in the construction shown of substantially the same length. As shown, the turned-forward end of this slide is provided with a short slot 20, through which the pin 11 passes, thus securing the slide movably in place at its forward end, such end lying between the two rollers 12.

21 is a hole in the projecting forward end of the slide 16 for the attachment of a chain 22, the other end of the chain being likewise attached to a corresponding shackle, as shown in Fig. 4. 23 is another hole in the slide, such hole in the construction shown being located at a point on the slide a little below the enlarged portion 8 when the slide is drawn back. Like the hole 21 this hole 23 is intended for the attachment of a chain, which at its other end is attached in a similar manner to a corresponding or companion shackle. The chain last referred to is indicated by 24.

25 is an eye, to which the chain 24 is secured at its center, said eye being swiveled to a hook 26.

27 indicates a section of track from which the hook 26 is suspended, and 28 indicates switches for regulating the rapidity with which hogs suspended from hooks 26 shall be fed forward.

29 indicates a hooked rod for engaging the chain 22 to effect a release of a hog from the shackle, as hereinafter explained.

As indicated by the drawings and by statements hereinbefore made, I contemplate the use of two shackles of the character described in connection with the elevation of each hog. To use a pair of these shackles, they are to be opened, as seen in Fig. 1, and each handle grasped by the operator. The hook ends 7 are to be thrust between the hind legs of a hog and each of said legs grasped by one of the hooks 7, and when so grasped each slide 16, by means of the handle or knob 17, is to be pulled back. This will cause the inner ends of the arms 10 to be pulled down, the antifriction-rollers 12 traveling in the slot 9, and the outer ends of such arms being attached to the chain 13 will be thrown forward, bringing such chain, or rather the leather covering 14 thereof, against the leg of the hog, thus firmly encircling and holding the leg between the covered chain and the hook 7. When each leg has been so secured, (and it will take but an instant to accomplish this,) the hook 26 on the chain 24 is to be connected to the usual hog-hoist and by such hoist the hog elevated, so that the said hook 26 can be placed on the rail or track 27. After the hog is "stuck" while so suspended the carcass is to be pushed along the rail, and when it is to be removed the hook on the rod 29 is to be engaged and the hook 26 is to be released from engagement with the rail or track 27. The strain is thus all brought on the chain 22, the effect on each shackle being to immediately draw the projecting end of the slide toward the forward end of the slot 19 in which it slides, which will cause its other end to swing down and draw back the connection 13, allowing the carcass to be released.

By the construction of shackle shown and described the connection 13, which is flexible or yielding, is brought into contact with the animal's leg, which is a great advantage over the ordinary metal arm which is thrown across the hook, as it prevents serious damage to such leg.

That which I claim as my invention, and desire to secure by Letters Patent, is—

1. In a hog-shackle, the combination with a bar provided at its forward end with a hook and with a slotted portion opposite said hook, of an arm secured in said slotted portion, a connection between the outer end of said arm and the body of the device, and means for moving said arm to throw said connection across the hook-opening, substantially as specified.

2. In a hog-shackle, the combination with a bar provided at its forward end with a hook and with a slotted portion opposite said hook, and an arm movably secured in said slotted portion, of a slide movably secured to said bar and to the pivot of said arm, whereby upon the movement of said slide the arm can be thrown across the hook, substantially as specified.

3. In a hog-shackle, a bar having at one end a hook, and provided with a slot at one side of said hook, in combination with two arms connected together at their ends, the upper connection traveling in said slot, a connection between the lower ends of said arms and the body of the device, and means for moving said arms to throw said last-named connection across the hook, substantially as specified.

4. In a hog-shackle, a bar having at one end a hook and provided with a slot at one side of said hook, in combination with two arms connected together at their ends, the upper connection traveling in said slot, of a slide movably attached near its lower end to said bar and movably attached at its upper end to the upper connection of said arms, and a flexible connection between the lower ends of said arms and the body of the device, adapted to be thrown across the hook when the said arms are moved downward by the slide, substantially as specified.

5. In a hog-shackle, a bar having at one end a hook and provided with two slots the planes of which are at right angles to each other and at the side of the hook, a slide movably secured in one of said slots, and a pair of antifriction-rollers traveling with the forward end of said rod, in combination with a pair of arms adapted to be moved by said slide, and a flexible connection between said arms and the body of the device, adapted to be thrown across the hook by the movement of the arms, substantially as specified.

6. In a hog-shackle, a bar provided at one end with a hook and with a slotted portion opposite said hook, arms movably secured on said slotted portion, and a connection extending from said arms to the body portion of said device and adapted to be thrown across the hook when said arms are moved, in combination with a slide for actuating said arms, a suspending-chain attached to said slide for locking the device as a whole to the leg of a hog, and another chain also attached to said slide for releasing the hog from the shackle when the weight of the hog is transferred from the first to the second of said chains, substantially as specified.

NATHAN MANDEL.

Witnesses:
ALBERT H. ADAMS,
NELLIE MCKIBBEN.